US008565986B2

(12) United States Patent
Glatthaar et al.

(10) Patent No.: US 8,565,986 B2
(45) Date of Patent: Oct. 22, 2013

(54) SYSTEM AND METHOD FOR OPERATING A DUAL CLUTCH TRANSMISSION DURING FAILURE OF AN ENGINE SPEED SENSOR OR A BUS CONNECTION BETWEEN CONTROL MODULES

(75) Inventors: Josef Glatthaar, Oberndorf (DE); Tobias Kalisch, Willingen-Schwenningen (DE); Oliver Ottinger, St. Georgen (DE); Bruce Palansky, Westland, MI (US)

(73) Assignees: GETRAG Getriebe- und Zahnradfabrik Hermann Hagenmeyer GmbH & Cie KG, Untergruppenbach (DE); GETRAG Transmission Corporation, Sterling Heights, MI (US)

( * ) Notice: Subject to any disclaimer, the term of this patent is extended or adjusted under 35 U.S.C. 154(b) by 965 days.

(21) Appl. No.: 12/477,801

(22) Filed: Jun. 3, 2009

(65) Prior Publication Data
US 2010/0241325 A1 Sep. 23, 2010

(30) Foreign Application Priority Data
Jun. 3, 2008 (DE) .......................... 10 2008 027 675

(51) Int. Cl.
*G06F 17/00* (2006.01)
*G06F 19/00* (2011.01)
*B60W 10/10* (2012.01)
*B60W 10/02* (2006.01)

(52) U.S. Cl.
USPC .................. 701/51; 701/58; 701/60; 701/63; 701/29.2; 477/107; 477/115

(58) Field of Classification Search
USPC ............. 701/29, 31, 34, 51, 55, 58, 62, 63, 1, 701/29.1, 29.2, 29.6, 29.7, 30.3, 31.7, 32.7, 701/33.5, 34.3, 34.4, 36, 53, 54, 56, 60, 61, 701/67, 68; 477/107, 110, 111, 115
See application file for complete search history.

(56) References Cited

U.S. PATENT DOCUMENTS

| 4,519,274 A | * | 5/1985 | Maruyama et al. ............... 477/1 |
| 4,949,078 A | * | 8/1990 | Ito et al. ......................... 340/635 |
| 5,064,039 A | | 11/1991 | Otsuka et al. |

FOREIGN PATENT DOCUMENTS

| DE | 691 11 625 T2 | 1/1996 |
| EP | 1 067 008 A2 | 7/2000 |
| WO | WO 2005/065982 A1 | 7/2005 |

* cited by examiner

*Primary Examiner* — Thomas Tarcza
*Assistant Examiner* — Edward Pipala
(74) *Attorney, Agent, or Firm* — Knobbe, Martens, Olson & Bear, LLP

(57) ABSTRACT

A system and method for maintaining the operation of an automated transmission (16), particularly a dual dutch transmission, for a motor vehicle, in case of a failure of an engine speed sensor (50) or a bus connection (44) between a first control module (42) controlling an engine (28) being connectable to the transmission (16) through at least one separation clutch (12, 149), and a second control module (34) controlling regulating units (12, 14) for connecting the engine (28) to the transmission (16) or to one or more driving wheels (34) in a force-transmitting manner, wherein gear-shift relevant data, particularly a number of revolutions ($n_o$) of the engine, is exchanged between the control modules (34, 42) over the bus connection (44).

15 Claims, 5 Drawing Sheets

| FIG. 3-1 |
| FIG. 3-2 |

SYSTEM AND METHOD FOR OPERATING A DUAL CLUTCH TRANSMISSION DURING FAILURE OF AN ENGINE SPEED SENSOR OR A BUS CONNECTION BETWEEN CONTROL MODULES

CROSS-REFERENCE TO RELATED APPLICATIONS

This application claims the priority of the German patent application DE 10 2008 027 675 filed on Jun. 3, 2008 which is fully incorporated by reference herewith.

BACKGROUND OF THE INVENTION

The present invention relates to a system and method for continuing the operation of an automated transmission of a motor vehicle, when a engine speed sensor or a data connection fails in terms of a data bus line between at least two control modules controlling cooperating components of a drive line and exchanging gear-shift relevant data between each other through the bus.

RELATED PRIOR ART

Different components of conventional automated transmissions of motor vehicles, such as an engine and a transmission, are typically controlled by different control modules, which can also be implemented in terms of a central control device. Particularly, dual clutch transmissions require a corresponding electronic control for ensuring the complex and difficult shifting processes in the two parallel partial transmissions (branches) of the dual clutch transmission, each of which has assigned its own frictional clutch (running dry or wet). There, the input members of the friction clutch are connected to a drive unit, such as to a combustion engine. However, the drive unit can also be an electric motor or a hybrid drive unit. The uneven gears (1, 3, 5, . . . ) are associated with one of the partial transmissions. The even gears (2, 4, 6, . . . ) are associated with the other partial transmission. The transmission of drive power from the drive unit to the driving wheels of a motor vehicle generally happens through one of the two partial transmissions. As a rule, a gear is pre-selected in the respective (inactive) partial transmission, which is not active. Then, a gear shift from the start gear, or source gear, of the active partial transmission to the target gear of the non-active partial transmission can happen by overlapping the actuation of the friction clutches on the input side. This overlapping actuation can then be performed such that any interruption of traction happens during the shifting of gears.

The controlling of the friction clutches, required for this purpose, and the engaging and disengaging of gears is caused in an automated manner due to the complexity of the process, namely by means of a superordinated control unit. This control unit selects the torque, which is to be transmitted through the respective friction clutches, by means of an engine control, and selects the transmission ratios, set in the respective partial transmissions, by means of a clutch and transmission control so that these elements are adapted to the current situation of travel (speed of the vehicle, traction operation or overrun, etc.).

Typically, during a shifting process the engine control module controls the number of revolutions, or the torque of the motor, such that a gear shift, which does not interrupt the traction, is possible while the traction control module opens and/or closes synchronizer devices of the gears, i.e. if, for example, a source gear is disengaged and a target gear is engaged subsequently. At the same time, conventionally the control modules communicate over a data bus connection such as a Controller Area Network (CAN) bus. The transmission control module typically controls the engine control module during the gear shift.

A CAN bus is an asynchronous bus system which was developed for networking control apparatuses in the automobile industry. The CAN bus operates in accordance with the CSMA/CR (Carrier Sense Multiple Access/Collision Resolution) method. A CAN network typically is formed as a line structure. Branch lines are allowed in a limited scope. Further, annular buses as well as star-shaped buses (e.g. central locking) are possible.

However, if this bus connection between the control modules fails, e.g. due to a cable break, conventional motor vehicles having automated transmissions may stand still. In order to shift gears, the transmission control module requires at least the information on the number of revolutions of the engine in order to effect, if necessary, the motor control correspondingly (in a reversed direction with respect to the data transmission). This is even more true for dual clutch transmissions. While the separation clutch(s) is/are opened and closed, the engine control module typically controls the number of revolutions of the engine, for example also through a position of a throttle plate. The number of revolutions of the engine, in turn, affects the torque which is transmitted through the separation clutch. Particularly during a start, i.e. if the separation clutch of a motor vehicle is closed, wherein a gear was engaged beforehand during standstill, it is typically necessary to re-adjust the number of revolutions of the engine correspondingly, in order to prevent stalling of the engine.

BRIEF SUMMARY OF THE INVENTION

Therefore, it is an object of the present invention to provide a system and method for ensuring the continuing operation of an automated transmission during a failure of a data bus connection between control modules being responsible for different components of the drive line of a motor vehicle, which in turn are to be adapted to each other during a gear shift.

This object is solved by a method for maintaining the operation of an automated transmission, particularly a dual clutch transmission, of a motor vehicle if an engine speed sensor fails or a bus connection fails between a first control module, which controls an engine connectable to the transmission by means of at least one separation clutch, and a second control module, which controls regulating units (e.g. synchronizer devices and/or separation clutches) for connecting the engine in a force-transmitting manner to the transmission or to one or more driving wheels, wherein the bus connection serves for exchanging gear-shift relevant data, particularly a number of revolutions of the engine, between the control modules, the method comprising the following steps: checking whether a number of revolutions of a shaft, particularly an engine shaft, which is detected by a sensor of the control module dedicated to this purpose, is transmittable from the control module via the bus connection to the other control module; and, if the number of revolutions is not transmittable, performing the following steps: opening all synchronizer devices assigned to the transmission, or to a partial transmission, so that the engine shaft cannot transmit force through a transmission shaft to the driving wheel(s) of the motor vehicle anymore; closing the separation clutch assigned to the transmission, or the partial transmission, comprising the opened synchronizer devices, if the separation clutch is not closed; detecting a number of revolutions of another shaft, particularly the transmission shaft, which can be connected to the shaft via the separation clutch, by means of a sensor dedicated to this purpose; and determining a shift-gear ramp function for one of the control modules, particularly the second control module, based on the detected number of revolutions, particularly from a field of characteristic curves, allowing the performance of a shift gear from a source gear to a target gear.

In this manner, it is possible to gain information on the number of revolutions of the engine, although the sensor dedicated to this purpose fails, or the data bus connection between the engine control and the clutch and transmission control fails. According to the prior art, redundant sensors or redundant bus systems are provided for this purpose. This becomes superfluous due to the present invention. Thus, the provision of a second set of components can be omitted, thereby obtaining significant reductions of costs and weight. The motor vehicle is nevertheless operable after the break down of the sensor or the data bus connection, even if in a limited manner only.

In the particular case of a dual clutch transmission, the number of revolutions of the engine even can be detected permanently. The clutch and transmission control can retrieve the number of revolutions of the engine at any time, although the bus connection is disturbed, and thus affect the regulating units being responsible for a shifting of gears, such as a separation clutch, in a smart manner in order to shift gears without damaging the transmission or allowing the motor to stall.

In accordance with a preferred embodiment the shift-gear ramp function represents one or more parameters selected from a group comprising parameters like: number of revolutions of the engine in a source gear; number of revolution of the engine in a target gear; position of a gas pedal and/or position of a throttle plate, and/or time-dependent displacement path for clutch elements of the separation clutch being assigned to the target gear.

The shift-gear ramp function is substantially dependent on the number of revolutions of the engine. The other quantities also affect the shift-gear ramp function. For example, it makes a difference if one shifts up, shifts down or starts. By means of the shift-gear ramp function it is ensured that a gear shift can nevertheless be performed in a safe manner, even if an engine speed sensor failed, and/or even if the bus connection fails. Preferably, the number of revolutions is detected for a predefined period of time, in order to generate a history of the number of revolutions allowing to derive whether or not a gear shift is going to happen soon.

Further, it is advantageous if a position of a gas-actuating element can be derived from the detected number of revolutions.

A driver's desire to shift a gear can be derived from the position of the gas-actuating element. If the number of revolutions of the engine constantly increases, it can be assumed that the driver accelerates the vehicle. If the number of revolutions decreases, it can be assumed that the driver has not sufficiently stepped on the accelerator (climbing a hill) or does not even step on the accelerator at all.

In accordance with another preferred embodiment, in reaction to a shift-gear command, which is communicated either by the control module or a user of the vehicle, a process for shifting a gear of the transmission is initiated based on the detected number of revolutions of the engine and, if necessary, based on the position of the gas-actuating element, by determining the appropriate shift-gear ramp function Here again, the idea expresses that the motor vehicle is supposed to not break down even if an error occurs. If the automated gear shift can also be actuated on the driver's demand (e.g. Tiptronic), the driver can nevertheless shift.

Further, it is advantageous if: the separation clutch is open; if necessary, a synchronizer device of an engaged source gear is open; an appropriate target gear is engaged by closing an associated synchronizer device and; subsequently, the separation clutch is closed again.

In accordance with another preferred embodiment the shift-gear ramp function is used during a time duration between the opening and the repeated closing of the separation clutch for affecting regulating units participating at the process of shifting the gear.

The process of shifting the gear represents the critical time duration within which the number of revolutions of the engine can change drastically. In case of a dual clutch transmission, the number of revolutions of the engine is nevertheless provided permanently due to the measurement of the number of revolutions of the inactive partial transmission. With a simple automated transmission the process of shifting a gear is to be performed as fast as possible, since during the gear shift as such no information on the number of revolutions of the engine is present. There is a very short time duration within which any of the separation clutches is closed.

Therefore, the method of the present invention can be particularly well utilized with dual clutch transmissions, since they allow to tap the number of revolutions of the engines permanently.

Additionally, it is advantageous if one retrieves whether an information on the current position of a gas-actuating element in terms of a gas-actuating parameter can be transmitted via the bus connection; wherein, if any information is transmissible, the detected number of revolutions is retrieved, the detected number of revolutions is compared to a threshold value, wherein the threshold value is a predefined number of revolutions of the engine, wherein the predefined number of revolutions corresponds to a predefined position of the gas-actuating element in an actuated state; and, if the detected number of revolutions becomes less than the threshold value, a gas-actuating parameter is set to zero so that a position of the gas-actuating element is represented in an non-actuated position, or, if the detected number of revolutions is greater then the threshold value, the gas-actuating parameter is increased about a value corresponding to the difference. In this manner, it is possible to derive the driver's desire (acceleration, deceleration, cruising, etc.) also from the detected number of revolutions of the engine.

It is clear that the above mentioned features and the ones to follow hereinafter are not only used in the respectively described combinations, but also in other combinations or alone, without departing from the scope of the present invention.

BRIEF DESCRIPTION OF THE SEVERAL VIEWS OF THE DRAWINGS

Embodiments of the invention are depicted in the drawings and will be explained in more detail in the following description.

DETAILED DESCRIPTION OF THE INVENTION

Figure 1:
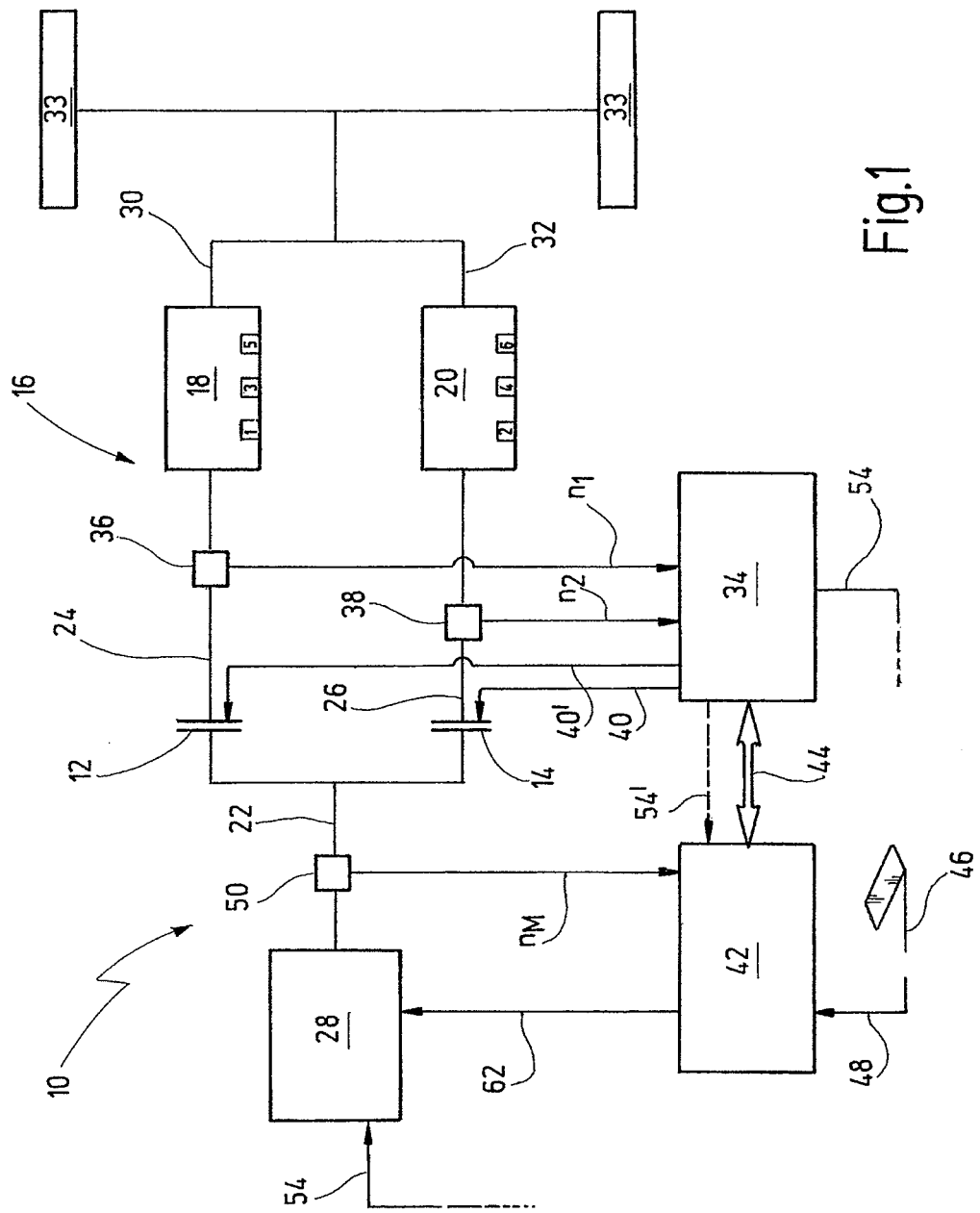
FIG. 1 shows a schematic block diagram of a drive line in accordance with the present invention.

FIG. 1 shows a simplified drive line 10 of a motor vehicle having a dual clutch transmission 16.

The drive line 10 comprises two friction clutches 12, 14 which function as separation and starting clutches dedicated to a first partial transmission 18 and a second partial transmission 20. Here, the first partial transmission 18 exemplarily represents the first, third and fifth gear. Here, the second partial transmission 20 exemplarily represents the second, fourth and sixth gear, respectively. Although here a dual shift transmission is shown, the following explanations and concepts can also be used with single shift gears, if correspondingly adapted.

The separation clutches 12, 14 are simple friction clutches, each of which can be actuated by means of a clutch actuator which is not shown in greater detail. In a closed position, the first separation clutch 12 connects an engine output shaft 22 in a friction-locked manner to a first transmission input shaft 24. This also applies to the second transmission line. The second separation clutch 14 connects, in the closed position thereof, the engine output shaft 22 in a friction-locked manner to a second transmission input shaft 26. The two shafts 22, 24 and 22, 26, respectively, are separated from each other in the opened position. During the opening and closing of the separation clutch 12 or 14, the respective separation clutch runs through a slip phase. On this occasion, two elements of the separation clutch having different numbers of revolutions are engaging with each other in a frictional manner. At the so-called "drag point" ("Schlepppunkt"), the clutch actuator has pushed both of the clutch elements rotating at different numbers of revolutions just so close to each other that a predefined drag torque is transmitted from the engine output shaft 22 to the transmission input shaft(s) 24 and/or 26. Then, the clutch elements, however, still have different numbers of revolutions.

The transmission 16 transmits the power of the engine 28 of the motor vehicle from the respectively selected transmission input shaft 24 or 26, which is driven by the engine output shaft 22, to a respective transmission output shaft 30, 32, which are also designated as output shafts 30, 32. The partial transmissions 18, 20 respectively drive a plurality of gear sets being not depicted here. Each gear set comprises at least two gear wheels. A shift clutch is arranged between the gear set at the output shafts 30 and 32, respectively, which is formed as a synchronizer device. The synchronizer device allows, during an engaging phase of a gear, to reduce the different numbers of revolutions between the engine output shaft 22 and the gear wheel to be connected thereto to zero, thereby synchronizing both of the transmission components. The transmitted power is then transmitted to one or more driving wheels 33. Further details with respect to the arrangement of a single shift transmission can be exemplarily found in DE 10 2008 008 065.9 entitled "Vorrichtung and Verfahren zum Verhindern von Fehlschaltungen in automatischen Getrieben von Kraftfahrzeugen" which was filed by the present applicant on Feb. 1, 2008, and which is fully incorporated by reference herewith.

The motor vehicle, which has incorporated the drive line 10, further comprises at least a clutch and transmission control module 34 as well as an engine control module 42.

The clutch and transmission control 34 is connected to engine speed sensors 36, 38 for detecting the number of revolutions $n_1$ and $n_2$, respectively, of the first transmission input shaft 24 and the second transmission input shaft 26, respectively. Further, the clutch and transmission control 34 transmits clutch signals over the lines 40, 40' to the clutch actuators, which are not depicted here, in order to actuate the separation clutches 12, 14 or adjustment elements thereof.

The engine control module 42 communicates with the clutch and transmission control module 34 via a data bus connection 44. It is clear that both the clutch control and the transmission control could be provided respectively with an autonomous module.

The engine control module 42 typically detects additionally the position of a gas-actuating element such as the position of a gas pedal 46, as it is schematically illustrated in FIG. 1. The information on the position of the gas pedal 46 is supplied to the engine control 42 in terms of a signal 48. The engine control 42 receives as another input signal a number of revolutions $n_e$ of the engine output shaft 22 from a speed sensor 50, detecting the revolutions of the engine output shaft 22. The number of revolutions $n_e$ of the engine as well as the gas-pedal position signal 48 are typically provided to the control module 34 over the data bus connection 44 such as a CAN bus. Based on this information, shift processes can be initiated and performed. For this purpose, the control module 34 particularly generates engine control commands 52 which typically affects the number of revolutions $n_e$ of the engine 28 by means of the engine control 42 during the shift process. The signal 52 could be used, for example, in order to change the position of a throttle plate.

Now, if, for which reason ever, the data bus connection 44 fails, the control module 34 lacks important parameters, particularly the number of revolutions $n_e$ of the engine as well as the position of the gas pedal, in order to perform the gear shift. Similar is true, if an engine speed sensor fails. It is important to know the number of revolutions of the engine $n_e$ as well as, preferably, the position, for example, of the gas pedal; alternatively, it would be sufficient to know the position of the throttle plate. This will be explained in the following with reference to the FIG. 2.

Figure 2:
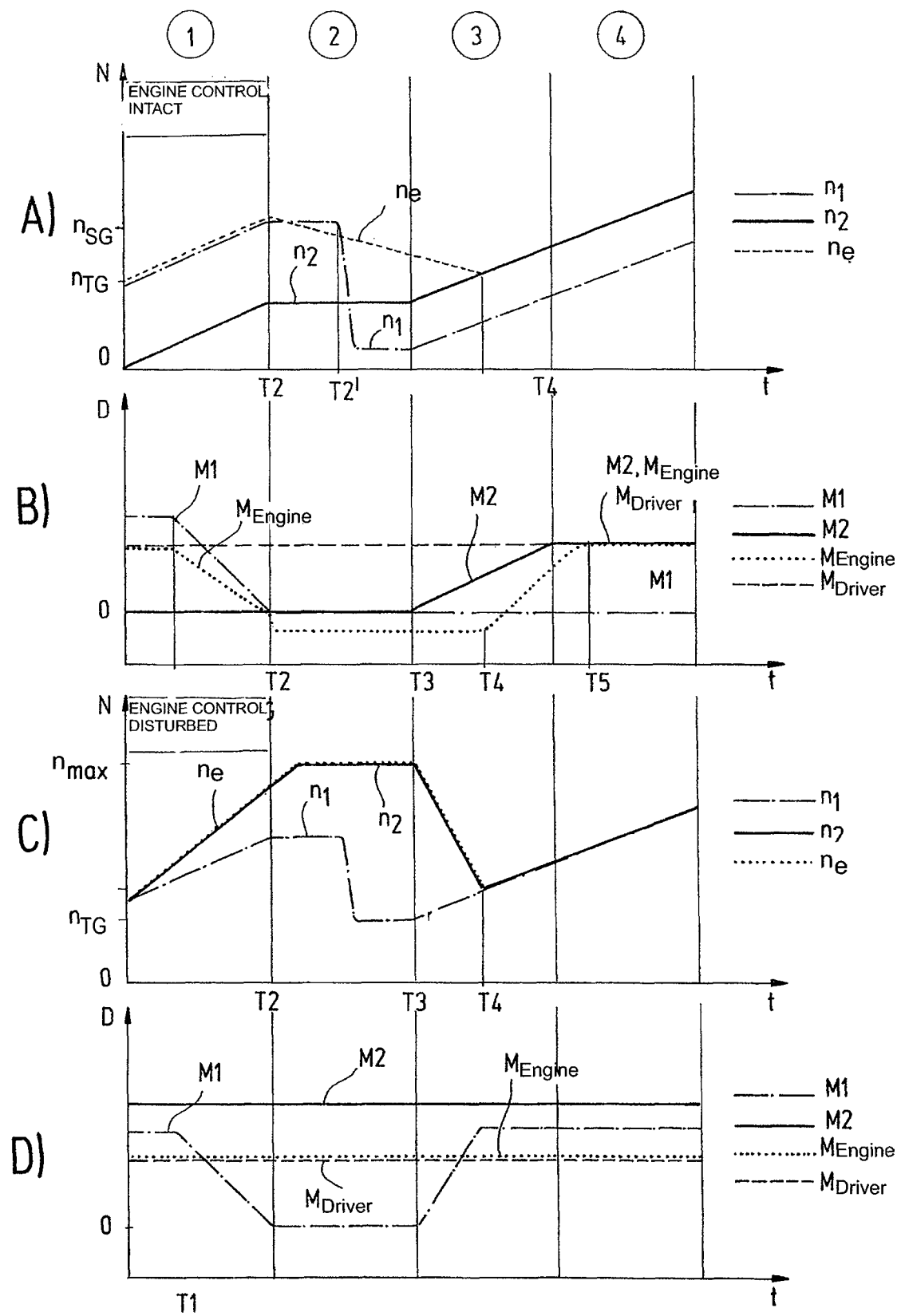
FIG. 2 shows a temporal course of the number of revolutions (FIG. 2A) and the torques (FIG. 2B) during a gear shift without any disturbance, and the temporal course of the number of revolutions (FIG. 2C) and the torques (FIG. 2D) if a disturbance is present.

FIG. 2 shows the temporal course of the numbers of revolutions of the transmission (FIG. 2A) and the applied torques (FIG. 2B), if the control is disturbed. A disturbance can be caused, for example, by a failure of the bus connection 44 or the failure of the engine speed sensor 50. The course of the number of revolutions and of the torques, in case of a disturbance, is shown in the FIGS. 2C and 2D, and designated by "ENGINE CONTROL DISTURBED". The normal operation is exemplarily designated by "ENGINE CONTROL INTACT". It is clear that these curves do not only apply if a (CAN) bus fails, but also if the sensor 50 fails.

FIG. 2 depicts a gear shift, if it is shifted up with traction. It is clear that the following explanations are applicable analogously for shifting up in an overrun mode, shifting down with traction as well as a shifting down in an overrun mode. Four temporal phases are respectively illustrated, which will be explained in the following in more detail.

FIG. 2A shows the temporal courses of the different numbers of revolutions of the partial transmission shafts as well as the engine shaft 22. The shaft of the first partial transmission rotates at the number of revolutions $n_1$. The shaft of the second partial transmission rotates at the number of revolutions $n_2$. The engine rotates at the number of revolution $n_e$. $n_1$ is depicted by a line consisting of strokes and points. $n_2$ is depicted by a solid line. $n_m$, is shown as a line of points. The association with the individual components of the drive line happens analogously in the other FIGS. 2B to 2D.

At the beginning of phase 1, under normal conditions, either the driver or the (superordinated) clutch and transmission control 34 takes the decision, particularly if the sensor 50 functions as well as the data connection 44 is stable, to shift a gear. Subsequently, it is assumed that a gear shift from the third gear to the fourth gear with traction is to be performed. The third gear is the source gear (SG). The fourth gear is the target gear (TG).

As can be taken from FIG. 2B, which is related to FIG. 3A, the separation clutch 12, which is associated with the partial transmission 18, comprising the third gear, is opened at the beginning of the phase 1. The separation clutch 12 reaches its drag point at the time T1. The torque of the first partial transmission 18 decreases from this moment, since the friction-locked connection between the engine output shaft 22 and the first transmission input shaft 24 is disengaged step by step. Also, the torque $M_{ENGINE}$, which is generated by the engine 28, decreases from this moment. The torque $M_{DRIVER}$, which is requested by the driver, remains the same since it is assumed that the driver steps with his foot constantly onto the gas pedal 46. The torque $M_2$ transmitted by the second partial transmission 20 is zero, although the fourth gear is already engaged. If the fourth gear is engaged, the second transmission input shaft 26 is connected to the second transmission output shaft 32 in a friction-locked manner. Since the wheels 33 roll, the number of revolutions $n_2$ of the second partial transmission 20 increases proportionally relative to the number of revolutions of the first partial transmission 18 driving the wheels 33. It is clear that the fourth gear could also be engaged at a later time only. Then, the curve (solid line) of the number of revolutions $n_2$ of the second partial transmission 20 would, however, look differently. Further, it is clear that presently the second separation clutch 14 is opened during the first phase.

At time T2, the first separation clutch 12 is completely opened. The torque $M_{ENGINE}$ of the engine drops below zero, since the engine is decelerated due to internal friction. At the time T2, the synchronizer device of the third gear is initiated to be opened. As can be seen in FIG. 2A, the number of revolutions $n_1$ of the first partial transmission 18 drops to a value at the time T2', which is greater than zero and corresponds to the number of revolutions of the first transmission output shaft 30, which is still rotating due to the rolling wheels 33. It is clear, that this number of revolutions is only designated by $n_1$, even in the following, just for the reason of simplicity, although the bus $n_1$ (only) designates the number of revolutions of the first transmission input shaft 24. The first transmission output shaft 30 can also optionally cooperate with a speed sensor (not shown in FIG. 1) for allowing at any time determination of the number of revolutions of the third partial transmission 18.

The number of revolutions $n_e$ drops from the time T2 due to an intervention of the engine control 42. The second partial transmission 20 (the fourth target gear being already engaged) still rotates at the number of revolutions $n_2$, which stays constant due to a lacking supply of torque, if frictional losses are not considered.

At the beginning of the third phase, at the time T3 one starts to close the second separation clutch 14. A torque is transmitted from the engine 28 through the second separation clutch 14 at the time T3, as represented by the increasing torque $M_2$ of the second partial transmission 20 in FIG. 2B.

The second separation clutch 14 reaches its drag point at the time T4. Then, the number of revolutions $n_e$ of the engine and the number of revolutions of the second partial transmission 20 are identical. The shafts 22 and 26 are engaging into each other by means of the second separation clutch 14. In FIG. 2A, this is represented in the third phase by the number of revolutions $n_e$ of the engine, being depicted with points, intersecting the solid-lined number of revolutions $n_2$ of the second partial transmission 20. The clutch and transmission control 34 regulates the engine 28 from this time T4 such that the torque $M_{ENGINE}$ transmitted from the engine to the respective partial transmission increases again until it has reached the torque $M_{DRIVER}$, desired by the driver, at the time T5. The time T5 can be within the third phase or the fourth phase. Then, the shift gear process is completed.

With reference to the FIGS. 2C and 2D, in the following the temporal course of the numbers of revolutions and the torques, respectively, if a disturbance is present, will be explained exemplarily during a failure of the bus connection 44. It is clear that these explanations also apply correspondingly to the case when, for example, the speed sensor 50 fails. As above, the third gear is engaged. Actually, now the fourth gear was supposed to be engaged. Since the control module 42 can not be responded by the control module 34 due to the interrupted bus connection 44, controlling of the engine is not possible during the scheduled gear shift. Therefore, a possible shift strategy will be considered in the following, where only gears of this partial transmission are utilized, which is active at the time of the disturbance. Presently, this is the first partial transmission 18 due to the engaged third gear. Instead of changing into the fourth gear, here it is shifted into the fifth gear, which also belongs to the first partial transmission 18. It is clear that also different shift strategies can be applied. A shift into the fourth gear is also possible, but will not be described here in detail.

FIG. 2C shows the different numbers of revolutions $n_1$, $n_2$ and $n_M$. FIG. 2D shows the different torques $M_1$, $M_2$, $M_{ENGINE}$ and $M_{DRIVER}$.

During the first phase the processes run analogously to the processes which are described with reference to the FIGS. 2A and 2B. However, the following exceptions are to be considered. The number of revolutions of the engine $n_e$ no longer can be regulated by the control module 34 due to the lacking bus connection 44. Since the driver (cf. $M_{DRIVER}$ in FIG. 2D) uses the gas pedal in a constant manner, the number of revolutions $n_e$ of the engine within the first phase will grow to a certain maximum value $n_{max}$. At this time, the engine nevertheless transmits only as much torque as desired by the driver, which is regulated by the control module 42. The number of revolutions $n_2$ follows the number of revolutions $n_e$ of the engine, since the output shaft 22 is connected, and respectively stays connected, to the input shaft 26 over the separation clutch 14.

The third gear is disengaged (synchronizer is opened) during the second phase of the FIGS. 2C and 2D, and the fifth gear is engaged, which is represented by a decreasing number of revolutions $n_1$ which adapts to the number of revolutions $n_{TG}$ of the target gear. At the beginning of the third phase, one starts to close the first separation clutch 12. The engine already rotates high; a positive torque is transmitted, whereby the number of revolutions $n_1$ slightly increases.

However, since the control module 34 knows the number of revolutions of the engine via the bypass of the other inactive partial transmission and also has further information with respect to the scheduled gear shift (3-5) as well as to the maximum number of revolutions $n_{max}$ of the motor 28, a gear-shift ramp function can be determined such that the number of revolutions $n_e$ of the engine rotates at the time T4 (reaching the drag point of the first separation clutch 12) with the same number of revolutions like the first partial transmission 18 (cf. $n_1$). The course of $n_e$ between T3 and T4 in FIG.

2C represents a "ramp", wherein at T4 the separation clutch is closed and the shafts are synchronized. The position of the intersection point between $n_e$ and $n_1$ depends on the gears to be engaged and, if necessary, on the driver's demands (i.e. $n_e$).

If the data bus connection 44 fails, as in the present case, and, thus, there is no possibility to directly influence the torque delivered by the engine 28, based on the gear shift ramp function there is the possibility, for example, to affect the torque, which is to be transmitted, by the setting mechanism of the first separation clutch 12. With other words, this means that the first separation clutch is closed such that the number of revolutions $n_e$ of the engine has suddenly dropped to a value, when the drag point T4 is reached, which is much lower than the maximum number of revolutions $n_{max}$. The intersection of the curves $n_e$ and $n_1$ is effected by the transmission ratio of the target gear and the speed of the motor vehicle.

Thus, FIG. 2C is different from the FIG. 2A only in the course of the number of revolutions $n_e$ of the engine and the number of revolutions $n_2$ following $n_M$. The FIG. 2D is different from FIG. 2D in the course of the engine torque. If the engine can not be regulated any longer, the engine torque $M_{ENGINE}$ being transmitted by the engine stays at the torque $M_{DRIVER}$ desired by the driver. The engine control 42 cannot be responded by the control 34. Still, one can shift. The torque $M_2$ of the second shaft 26 remains unchanged.

Figure 3:
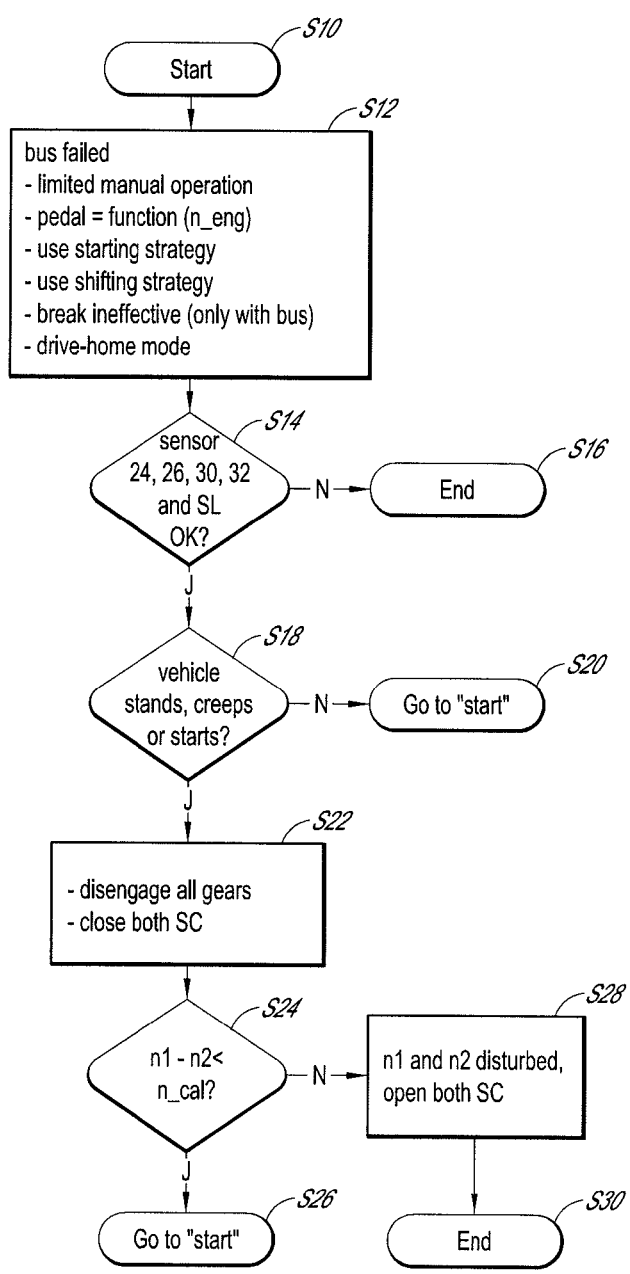
FIG. 3 shows a flow chart of a method in accordance with the present invention.
Figure 1:
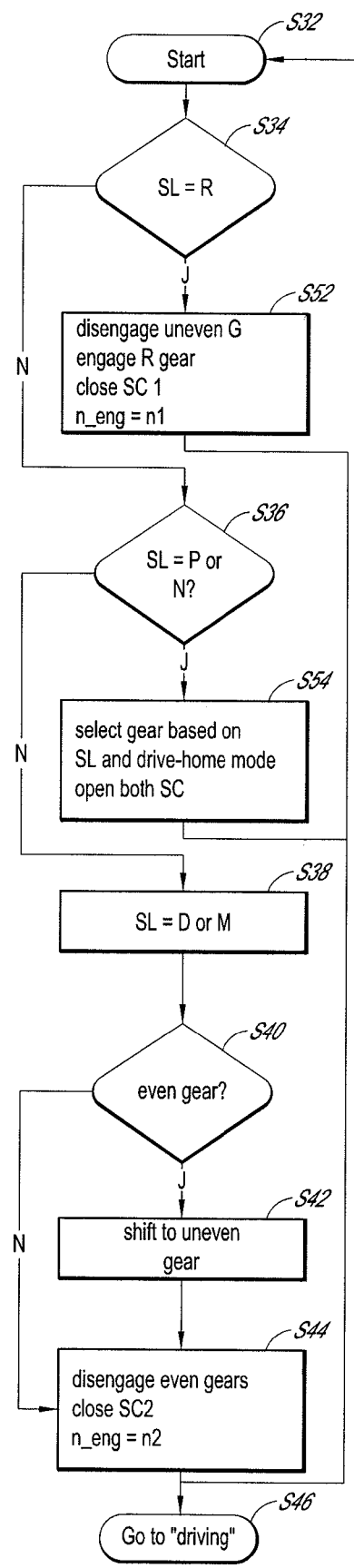
Figures 2, 3:
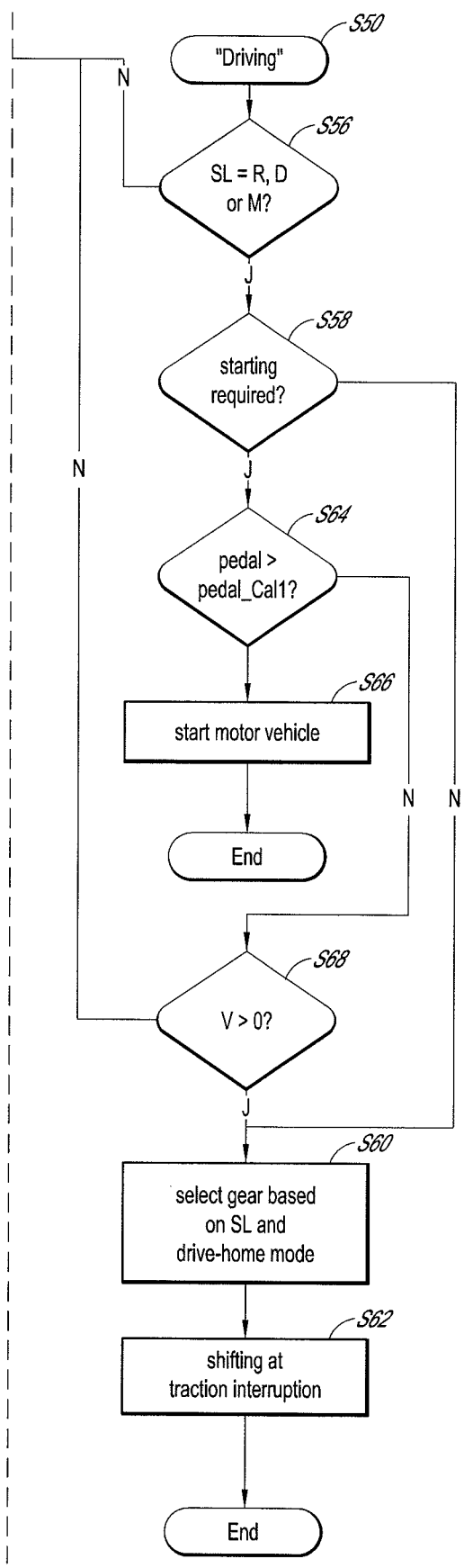

With reference to FIG. 3 a method in accordance with the present invention for maintaining the operation of a motor vehicle having an automated transmission will be explained in the following, if, during the operation, a disturbance within the control occurs, which would normally result in a turn-off or termination of the operation of the motor vehicle.

In the following, the non-limitative case will be discussed when the bus connection 44 has failed.

The method starts in step S10. In this context, it is assumed that the bus 44 has failed so that: (optionally) a limited manual operation is possible; the position of the gas pedal 46 is a function of the number of revolutions of the engine; either a starting strategy or a shifting strategy is to be applied; commands from the brake will not be executed during the shift process; and the automated transmission is to be operated in a drive-home mode. These assumptions are exemplarily depicted in box S12.

In step S14 it can be checked whether the sensors 36 and 38—and optionally the sensor 50 as well—do function at all. Provided sensors dedicated to the transmission output shafts 30, 32 and a selection lever (SL) are provided, they also can be checked in the step S14. If one or some of the sensors do not deliver any information, this can already result in a termination of operation, as depicted in step S16.

In the following, it is assumed that at least the sensors 36 and 38 of the transmission input shafts 24 and 26 as well as sensors not shown in FIG. 1, which are dedicated to the transmission output shafts 30, 32 and a selection lever, are operating.

In step S18 it is determined, whether the motor vehicle moves, i.e. if the motor vehicle stands, creeps (very slow ride) or starts. If the motor vehicle drives normally, in step S20 it is changed to step S32 which will be explained in the following.

If the motor vehicle stands, creeps or starts, all gears are disengaged, i.e. all synchronizer devices of the partial transmissions 18 and 20 are opened so that there is not any friction locked connection between the transmission input and output shafts 24, 30 and 26, 32. Subsequently, both separation clutches (SC) 12, 14 are closed so that the transmission input shafts can rotate at the number of revolutions of the engine 28.

If the difference of the number of revolutions $n_1$ of the first transmission input shaft 24 is beneath a predetermined tolerance threshold (n_cal), the method in accordance with the invention continues to step S32. However, if there are greater differences in the number of revolutions $n_1$ and $n_2$, it is determined in step 28 that at least one of the sensors 36, 38 must to be disturbed. In this case, both separation clutches 12 and 14 are opened in the step S28, and the operation of the motor vehicle will be determined in step S13.

If the method of the present invention arrives at the step S32, it is checked in a next step S34, whether the selection lever SL is set to reverse. If it is not intended to drive reversely, in step S36 it is checked whether the motor vehicle is in a parking mode P or in a neutral mode N.

If the vehicle is neither parked nor a gear is engaged, in step S38 it is determined that the selection lever SL is either in the drive position D or in the position N for manually shifting. In this case, it is retrieved in step S40 whether, for example, an even gear (of the second partial transmission 20) is engaged. If an even gear is engaged, it is shifted into an uneven gear in step S42. If an uneven gear is already engaged, all even gears are disengaged and the second separation clutch is closed. In this case, the second transmission input shaft 26 rotates at the number of revolutions $n_2$, which in turn corresponds to the number of revolutions n_eng of the engine (cf step S44). Then, in step S46 one continues to the step S50 "driving".

If it is determined in the step S34 that the driver intends to drive reverse, all uneven gears are disengaged, wherein here it is assumed that the reverse gear R is part of the second partial transmission 20. This happens in step S52. During the step S52, also the reverse gear is engaged, and the first separation clutch 12 is closed. In this case, the first transmission input shaft 24 rotates at the number of revolutions $n_1$, which in turn corresponds to the number of revolutions n_eng of the engine. Subsequently, it is continued at the step S46 then.

If the inquiry of the step S36 results in that the selection lever is in the position D or N, a gear is selected either by actuating the selection lever or in an automated manner according to the drive-home mode. Subsequently, both separation clutches 12 and 14 (cf step S54) are opened. If these two actions are c, one proceeds to the step S46. If it is proceeded to the step S50, due to the step S46, it is requested at an inquiry S56, whether the selection lever is in the position of the reverse gear R, the forward gear D or in a manual mode M. If this is not the case, the method of the present invention returns to the step S32.

However, if this is the case, it is checked at an inquiry S58 whether the motor vehicle is to be started.

If the vehicle already travels, a gear is selected based on the position of the selection lever or on commands of the control being in the drive-home mode (cf step S60). Subsequently, one shifts, for example, with an interruption of traction as already explained in greater detail in the context of the FIGS. 2C and 2D.

If it is determined in step S58 that one has to start, the position of the pedal 46 is checked in step S64. If the position of the pedal is greater than a preset threshold value, the vehicle is started in step S66. Otherwise, the inquiry S68 checks whether the speed of the vehicle is greater than zero. If the speed of the vehicle is greater than zero, such as when the vehicle rolls down a hill, the control can wait for an appropriate time, in order to engage the selected gear in the step S60.

The control determines a gear-shift ramp function, considering shifting parameters, in order to adapt to the respective situation and requirement (starting, shifting-up or shifting-down, with traction or overrun, disturbance during travel or starting, or similar). For example, the displacement path of the clutch elements can be influenced by the gear-shift ramp function, dependent on the time, if it is not possible to influence the engine 28 due to the failure of the bus 44. However, if appropriate precautions have been taken, such as providing a data connection 54 between the control module 34 and the engine 28, the control 34 can also influence the engine 28 directly.

These explanations show how important the knowledge of the number of revolutions of the engine is, as well as preferably the knowledge of the magnitude of a parameter influencing the number of revolutions of the engine, such as the position of the gas pedal or the position of the throttle plate.

Figure 4:
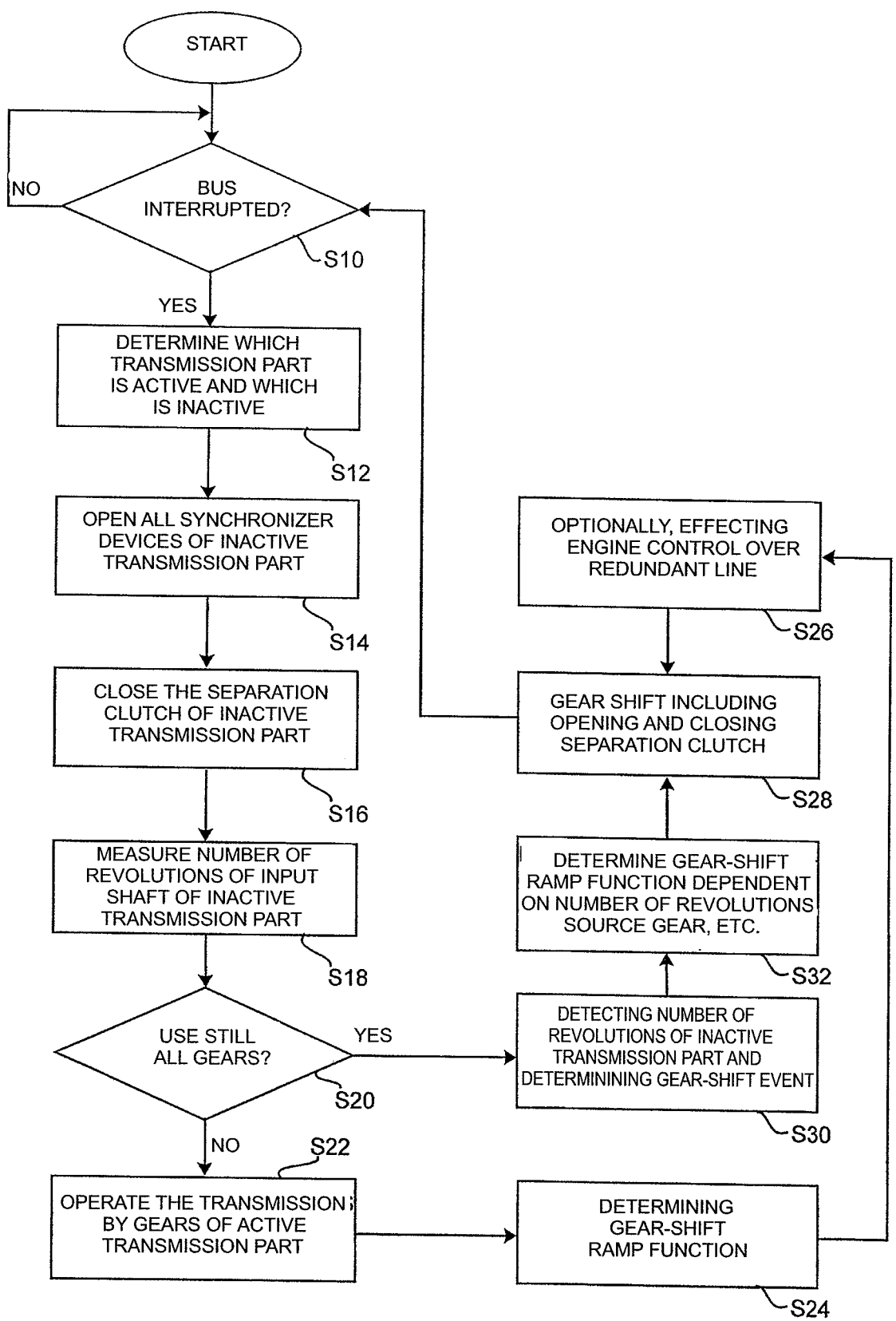
FIG. 4 shows a simplified flow chart of another embodiment of the method of the present invention.

With reference to FIG. 4 a simplified embodiment of the method in accordance with the present invention will be explained in an exemplary manner using the drive line 10, which is illustrated in FIG. 1, having an automated dual clutch transmission, if a databus connection 44 between the control modules 42 and 34 fails.

In a first step S100, one of the control modules responsible for the performance of a gear shift, such as the control module 34, requests whether the bus connection 44 is interrupted. If it is not interrupted, then the inquiry is repeated within intervals having distances free of choice, preferably briefly before a gear shift is performed. If it is determined that the bus connection 44 is interrupted, then it is preferably determined which partial transmission (18 or 20) is active or which partial transmission is inactive. In the following it is assumed that at the time of the disturbance of the databus connection 44 the third gear of the first partial transmission 18 is engaged. Thus, the second partial transmission 20 is inactive so that the separation clutch 14 is open. However, the first separation clutch 12 of the first partial transmission 18 is closed.

Now, in another step S114 all synchronizer devices of the inactive partial transmission 20 are open, i.e. the gears 2, 4 and 6 are disengaged by means of their respective synchronizer clutches, if not yet happened already.

Subsequently, the second separation clutch 14 of the inactive partial transmission 20 is closed in a step S116. This is possible, since there is no friction-locked connection between the second transmission input shaft 26 and the second transmission output shaft 32. The synchronizer devices of the partial transmission 20 are open. The first separation clutch 12 is still closed, and thus effects a friction-locked connection of the first transmission input shaft 24 to the first transmission output shaft 30. The engine output shaft 22, the first transmission input shaft 24, the second transmission input shaft 26 as well as the first transmission output shaft 30 rotate all at the same speed, namely the number of revolutions $n_e$ of the engine 28. This number of revolutions is measured in another step S118.

In a step S120 it is optionally decided whether all gears of the dual clutch transmission are still to be used.

In a step S122 it can be decided that the motor vehicle is to be operated only by means of the gears of the active partial transmission 18, i.e. the first, third and fifth gear. This is sufficient for driving the motor vehicle at least home or to the next garage. At that time, the comfort of driving can suffer in comparison to an operation without disturbances. However, the motor vehicle does not completely break down due to the breakdown of the databus.

Then, in a step 124 a gear-shift ramp function is determined in case of a gear-shift command, based on the number of revolutions $n_2$ of the second transmission input shaft 26, which is preferably detected continuously. The gear-shift ramp function can be converted into a time-dependent displacement command for the clutch actuators (which are not depicted here) of the separation clutch 12 or 14. Since the data connection is interrupted not only from the engine control module 42 to the clutch transmission control module 34 but also in the inverted direction, it is not possible to influence the number of revolutions of the engine 28 by the aid of the engine control 42 during the shifting process, for example, from the third gear into the fifth gear. However, since the control module 34 knows about the schedules shift from the third gear into the fifth gear, and since the control module 34 also permanently knows the number of revolutions of the engine, because the number of revolutions $n_2$ of the second transmission input shaft 26 is preferably measured continuously, the control module 34 can vary the shifting process by, for example, opening and closing the separation clutch 12 either fast or slow. Possibly, the driver perceives this in terms of a jolt of the vehicle. However, since the method in accordance with the present invention deals with an emergency, this can be accepted. Otherwise the motor vehicle could not be moved at all.

However, if there is a redundant data connection 54' from the clutch and transmission module 34 to the engine control module 42, then the engine 28 can directly influence the number of revolutions $n_e$ of the engine. Alternatively, the clutch and transmission control module 34 could also be connected, with respect to a regulation, directly to the engine 28 over a line 54. This option is shown in the other optional method step S126.

As a result, shifting of a gear is performed (cf step S128). As soon as the gear shift is completed, the method of the present invention returns to the start.

With another embodiment of the method of the present invention also both partial transmissions 18 and 20 could still be used, if it is decided in the step S120 that all gears are still to be used. Then, the control module 34 preferably detects the number of revolutions $n_1$ or $n_2$ of the inactive partial transmission, and, by monitoring these numbers of revolutions, particularly the temporal course or the temporal change of these numbers of revolutions, determines events which initiate a gear shift. If the number of revolutions of one of the transmission input shafts 24, 26 is changed such that a gearshift triggering event is present, then the control module 34 determines the associated gear-shift ramp function. If, in the case of the dual transmission, still both partial transmission 18 and 20 are to be used, it can be advantageous if both numbers of revolutions $n_1$ and $n_2$ of the transmission input shafts 24, 26 are monitored, preferably simultaneously, as well as permanently compared to each other for the purpose of a plausibility check.

It is clear that the method of the present invention can also be performed such that it is determined in advance which transmission input shaft is to be used at a higher priority for determining the number of revolutions of the engine. However, the inactive partial transmission is preferably used. Further, it is possible to determine the number of revolutions between both of the partial transmissions in an alternating manner.

Due to the so determined numbers of revolutions of the engine it is further possible to obtain information on a gasactuating element such as the position of the gas pedal 46. As it is known, the engine control 42 does not supply this information to the control module 34 any longer due to the breakdown of the databus connection 44. However, the driver's desire can be simulated by using the determined number of revolutions of the engine.

For this purpose, a number of revolutions of the engine in terms of a threshold value is determined in advance, which is initially assigned to a predetermined position of the gas pedal 46. This threshold value should be greater than the number of revolutions of the engine during idle-speed. Then, if the current number of revolutions of the engine is above this threshold value, this current number of revolutions is assigned to a position of the gas pedal which is greater by the same ratio like the detected number of revolutions is greater than the threshold value. This value, which represents the position of the gas pedal, is reassigned to the threshold value, i.e. the original value for the initial position of the gas pedal is replaced by the value of the new position of the gas pedal. This process is repeated that often, until the number of revolutions of the engine reaches a value which is smaller than the threshold value. In this case, the threshold value is assigned to the pedal position 0. It is possible to simulate the position, for example, of the gas pedal in this manner. Among other things, this quantity can be used for deciding whether or not a gear is to be shifted.

It is clear that the above explanations can also be applied to automated single shift transmission. The number of revolutions of the engine can always be determined by opening all synchronizer devices so that there is no friction-locked connection between the transmission input shaft and the transmission output shaft. Then, if the separation clutch is closed, the transmission input shaft rotates at the same speed as the engine output shaft. Of course, a shifting process, which is regulated in that manner, takes possibly a little longer than a conventional shifting process. Nevertheless, the vehicle is prevented from breaking down due to a failure of the bus connection 44.

With a dual transmission, both partial transmissions can be used, wherein there is no verified information on the number of revolutions of the engine for a brief moment, if both separations clutches are open, so that the separation clutch is operated in terms of an open control loop, in order to transmit a desired torque. The information required for this purpose can be derived from corresponding fields of characteristic lines. However, if only one single partial transmission is used in an emergency instance/drive-home mode a closed control loop is present, because the number of revolutions of the engine can be requested continuously from the inactive partial transmission.

Therefore, we claim:

1. A method for maintaining the capability to shift gears of an automated transmission for a motor vehicle, in case of a failure of an engine speed sensor or a bus connection between a first control module, which controls an engine being connectable to the transmission by means of at least one separation clutch, and a second control module, which controls the at least one separation clutch for connecting the engine to the transmission in a force-transmitting manner, wherein gear-shift relevant data is exchanged between the control modules over the bus connection, the method comprising the steps:

checking whether a number of revolutions of an engine shaft, which is detected by a sensor of one of the control modules dedicated to this purpose can be transmitted from the one of the control modules over the bus connection to the other one of the control modules; and
   performing the following steps, if the number of revolutions cannot be transmitted:
   opening all synchronizer devices assigned to the transmission or one of the partial transmissions so that the engine shaft can no longer transmit force via a transmission shaft to at least one driving wheel of the motor vehicle;
   closing the separation clutch assigned to the transmission or the partial transmission comprising the opened synchronizer devices, if this separation clutch is not closed;
   detecting a number of revolutions of another shaft which can be connected to the engine shaft through the separation clutch by means of an other sensor of the other control module, wherein the other sensor is dedicated to this purpose; and
   determining a gear-shift ramp function for one of the control modules based on the detected number of revolutions for allowing performance of a shifting process from a source gear to a target gear.

2. The method of claim 1, wherein the gear-shift ramp function represents one or more parameters being selected from a group: a number of revolutions of the engine in a source gear, a number of revolutions of the engine in a target gear, one of a position of a gas pedal and a position of a throttle plate, and a time-dependent displacement path for a clutch element of the separation clutch associated with the target gear.

3. The method of claim 1, wherein the number of revolutions is detected over a predefined period of time in order to generate a history of the numbers of revolutions.

4. The method of claim 3, wherein the number of revolutions is detected over the predefined period of time continuously.

5. The method of claim 1, wherein a position of a gas-actuating element is derived from the detected number of revolutions.

6. The method of claim 1, wherein based on the detected number of revolutions and, if necessary, the position of the gas actuating element, a process for shifting a gear of the transmission is initiated in response to a shift-gear command, which is issued either by the control module or an operator of the motor vehicle.

7. The method of claim 6, wherein the separation clutch is opened, a synchronizer device of an engaged source gear is opened, an appropriate target gear is engaged by closing an associated synchronizer device, and the separation clutch is subsequently closed again.

8. The method of claim 7, wherein the gear-shift ramp function is applied during a period of time between the opening and the re-closing of the separation clutch.

9. The method of claim 1, wherein the transmission is a dual clutch transmission having a first partial transmission and an associated first separation clutch, and a second partial transmission and an associated second separation clutch, wherein all synchronizer devices of an inactive partial transmission are opened and the separation clutch of the inactive partial transmission is closed, which is momentarily not transmitting a force from the engine to the driving wheel, in order to detect the number of revolutions at the inactive partial transmission.

10. The method of claim 9, wherein the number of revolutions of the inactive partial transmission is determined continuously.

11. The method of claim 1, further comprising the steps of:
   requesting whether an information on the current position of a gas-actuating element in terms of a gas-actuating parameter can be transmitted over the bus connection;
   if any information can be transmitted, requesting the detected number of revolutions;
   comparing the detected number of revolutions to a threshold value, wherein the threshold value is a predefined number of revolutions of the engine, wherein the predefined number of revolutions of the engine corresponds to a predefined position of the gas actuating element in an actuated state;

if the detected number of revolutions is less than the threshold value, setting a gas-actuating parameter to zero so that a position of the gas-actuating element is represented in a non-actuated state; or if the detected number of revolutions is greater than the threshold value, increasing the gas-actuating parameter by a value corresponding to the difference.

12. The method of claim 1, wherein the gear-shift relevant data is a number of revolutions of the engine.

13. The method of claim 1, wherein the other shaft is a transmission shaft.

14. The method of claim 1, wherein the shift-gear ramp function is based on a field of characteristic lines, the lines being characteristic for specific shift gears.

15. System for maintaining the capability to shift gears of an automated transmission, particularly a dual clutch transmission, for a motor vehicle during failure of a bus connection between first and second control modules, the system comprising: the automated transmission; the first and second control modules connected to each other over the bus connection; at least one speed sensor; control module controlling an engine connectable to the transmission through at least one separation clutch, and a second control module controlling regulating units for connecting the engine to the transmission or to driving wheels in a force-transmitting manner, wherein gear-shift relevant data, preferably a number of revolutions of the engine, is exchanged between the control modules over the bus connection, wherein one of the control modules are adapted for performing the method comprising the steps of:

checking whether a number of revolutions of an engine shaft, which is detected by a sensor of one of the control modules dedicated to this purpose can be transmitted from the one of the control modules over the bus connection to the other one of the control modules; and performing the following steps, if the number of revolutions cannot be transmitted:

opening all synchronizer devices assigned to the transmission or one of the partial transmissions so that the engine shaft can no longer transmit force via a transmission shaft to at least one driving wheel of the motor vehicle;

closing the separation clutch assigned to the transmission or the partial transmission comprising the opened synchronizer devices, if this separation clutch is not closed;

detecting a number of revolutions of another shaft which can be connected to the engine shaft through the separation clutch by means of an other sensor of the other control module, wherein the other sensor is dedicated to this purpose; and determining a gear-shift ramp function for one of the control modules based on the detected number of revolutions for allowing performance of a shifting process from a source gear to a target gear.

* * * * *